Figure 1:
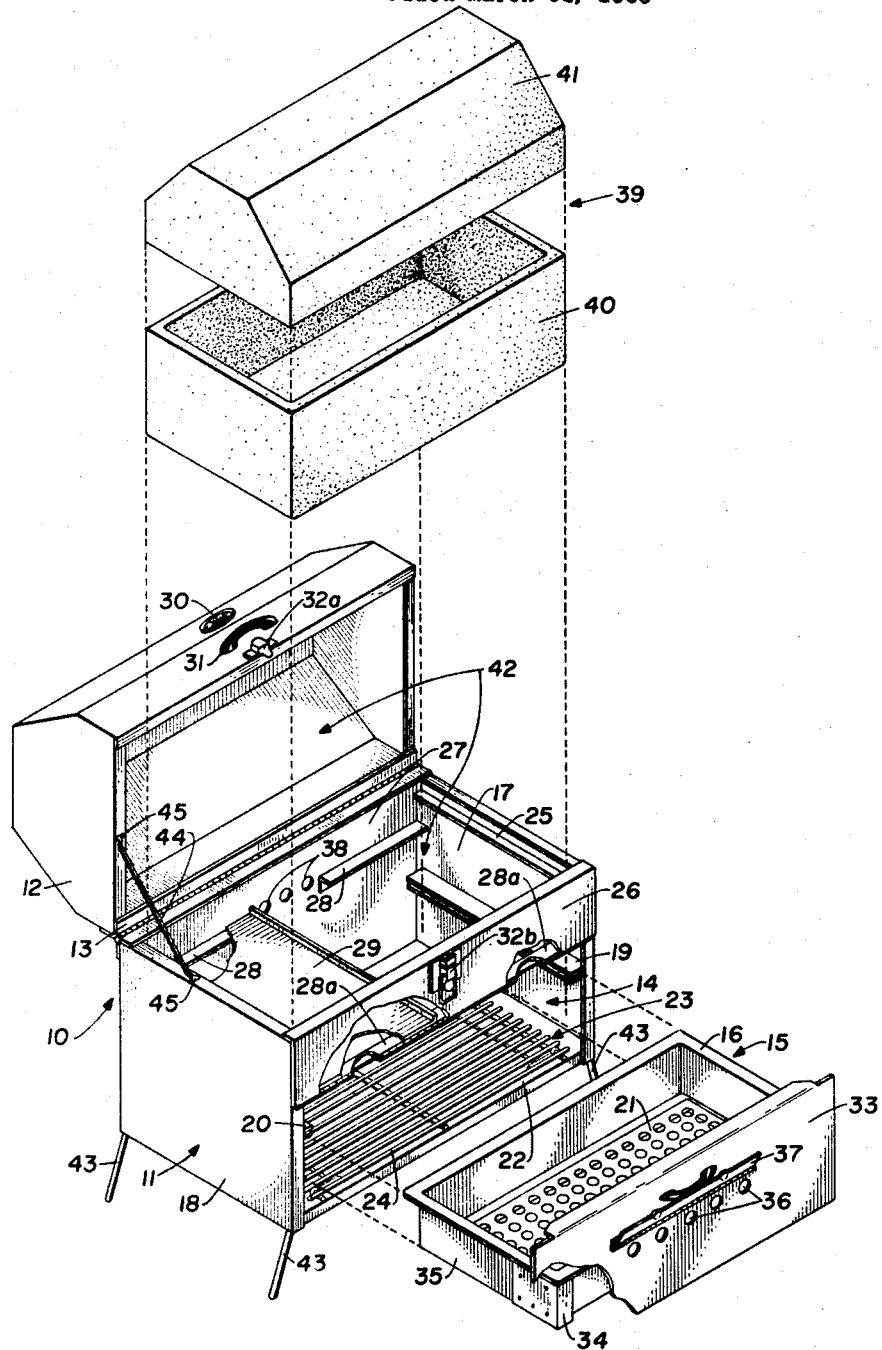

April 30, 1968   J. E. STALKER   3,380,444
TRANSPORTABLE COOKING AND STORAGE APPARATUS
Filed March 31, 1966

INVENTOR
JAMES E. STALKER
Richards, Harris
and Hubbard ATTORNEYS

United States Patent Office 3,380,444
Patented Apr. 30, 1968

3,380,444
TRANSPORTABLE COOKING AND
STORAGE APPARATUS
James E. Stalker, Richardson, Tex., assignor to Home Metal Products Company, Plano, Tex., a corporation of Texas
Filed Mar. 31, 1966, Ser. No. 539,029
4 Claims. (Cl. 126—25)

This invention relates to transportable cooking apparatus, and more particularly, to a compact, transportable cooking apparatus which accommodates a storage cabinet within its confines.

In preparing for family outings and the like, it is common to include both a transportable cooking apparatus, such as a barbeque grill, as well as a storage chest, which may take the form of a Styrofoam container, in which is usually packed various eatable items. Both the cooking apparatus and the storage chest are usually bulky and occupy a great deal of space in the family vehicle.

It is an object of the present invention to provide a compact, transportable cooking apparatus, such as a barbeque grill, which receives and stores within its confines a storage chest, such as a Styrofoam box.

The invention may be generally described as a compact, transportable cooking and storage apparatus which includes a cavity-defining cabinet having a base and a lid pivotally mounted to the base. Rail means are carried by the base between the top and bottom for supporting a briquette tray which can be inserted and removed from the base. The bottom of the briquette tray and the bottom of the cabinet base define a space therebetween when the tray is inserted into the cabinet. A removable grill can be stored within the space defined between the bottom of the base and the briquette tray or supported by the base above the tray when it is to be used. The apparatus also includes a storage chest which is adapted to be received within the cavity defined by the base and lid of the cabinet when the grill has been removed from the top of the base and stored within the space defined between the briquette tray and the base.

To be more specific, reference is made to the drawing.

FIGURE 1 is an exploded partially cutaway perspective view of one embodiment of the present invention.

In FIGURE 1, a cabinet 10 includes a base 11 and a lid 12 which is pivotally mounted to the base 11 by a piano hinge 13. Base 11 is provided with an opening 14 in the front thereof to permit insertion and removal of briquette tray 15. Briquette tray 15 is provided with a lip 16, the lateral edges of which are adapted to be received within rail means carried by sides 17 and 18 of base 11. The rail means in the illustrated embodiment take the form of U-shaped rails 19 and 20. The closed ends of rails 19 and 20 are affixed to sides 17 and 18, respectively, by conventional means such as welding or the like.

Upon insertion of tray 15 into base 11, the foraminous bottom 21 of tray 15 will define with the bottom 22 of base 11, a space generally designated by the numeral 23 within which may be stored a grill 24.

Upon removal of tray 15 from base 11, as illustrated in FIGURE 1, grill 24 may be removed from the space 23 and supported proximate to the top of base 11 by ledge 25 which is secured to side 17 of base 11 by welding or the like, and a corresponding ledge (not illustrated) attached in a similar manner to side 18 of base 11.

Intermediate the top of base 11 and rails 19 and 20, the rear panel 27 of base 11 supports two L-shaped brackets 28 which are secured to panel 27 by any conventional means such as welding or the like. Panel 26 is provided with an inturned edge 28a opposite brackets 28. Supported by brackets 28 and edge 28a is a removable heat deflecting plate 29 which may be moved along brackets 28 and edge 28a to deflect heat from the briquettes contained in tray 15.

Lid 12 carries a temperature indicating device 30 and the handle 31 both of which are affixed to lid 12 in any suitable manner. Lid 12 may conveniently carry a second handle (not illustrated) on the top surface thereof to permit easy transportation of the apparatus. Lid 12 also carries the tongue portion 32a of a conventional loop latch. Tongue portion 32a mates with the bottom half of the latch 32b which like portion 32a is secured to cabinet 10 by welding or the like.

Tray 15 is provided with a front panel 33 which upon insertion of tray 15 into base 11 will cover opening 14. Tray 15, of course, is inserted by positioning lip 16 between the extensions of U-shaped rails 19 and 20. Panel 33 is supported at one end against lip 16 by an L-shaped bracket 34. The opposite end of panel 33 is supported by a like bracket (not illustrated). The extensions of bracket 34 and its counterpart are secured to pan 35 and the panel 33 in any conventional manner such as by welding or the like. Panel 33 is provided with a plurality of apertures 36 which permit air to flow through panel 33 down along the side of pan 35 and up through foraminous bottom 21 for ventilating briquettes supported on tray 15. The degree of ventilation may be controlled by use of hinge flap 37 in a conventional manner. The back panel 27 of base 11 is likewise provided with a plurality of apertures 38 which are positioned above tray 15 and the degree of ventilation through these apertures may likewise be regulated by a hinge flap (not illustrated) secured to the back of base 11. The cabinet 10 may include legs 43 which may be pivotally mounted in a conventional fashion to permit retraction under base 11.

When the apparatus is to be prepared for transportation, grill 24 is placed within space 23 after removal of tray 15 from base 11. Heat deflecting plate 29 is removed from brackets 28 and laid in a flat position on foraminous bottom 21 after which tray 15 is inserted in base 11. Storage cabinet 39, which includes a bottom 40 and top 41 of Styrofoam or the like, is then dropped along the path illustrated by the dotted lines into base 11 where it will come to rest on heat deflecting plate 29 placed on tray 21. Lid 12 may be closed and the loop latch secured to contain storage cabinet 39 within the cavity defined by base 11 and top 12 which is generally indicated by the reference numeral 42. It will be noted that the configuration of top 41 corresponds to the configuration of lid 12 so that maximum space within the cabinet 10 will be utilized. It is obvious from the above that the apparatus in a transporting position permits maximum utilization of space.

To place the apparatus in a cooking position, the storage cabinet 39 is removed from cavity 22 after opening lid 12 and the tray 15 is removed from base 11. Heat deflecting plate 29 may then be removed from tray 15 and placed on the brackets 28 and edge 28a or set aside, if heat deflection is not desired. Grill 24 is then removed from space 23 and positioned proximate the top of base 11 where it can be supported by ledge 25 and the corresponding ledge (not illustrated) supported by side 18. Briquettes may then be placed on the foraminous tray 21 and tray 15 inserted into base 11.

If cooking is to be done on an open grill, the lid 12 may be supported in the FIGURE 1 position by use of a retaining bar 44. The enlarged (not illustrated) ends of bar 44 abut T-slots 45 in base 11 and lid 12 when base 11 and lid 12 are in the FIGURE 1 position.

While rather specific terms have been used to describe one embodiment of the invention, they are not intended,

What is claimed is:

1. A compact, transportable cooking and storage apparatus, comprising, in combination:
   (a) a cavity-defining cabinet including a base and a lid pivotally mounted thereon,
   (b) rail means carried by said base intermediate the top and bottom thereof,
   (c) a briquette tray adapted to be supported by said rail means and adapted to be inserted and removed from said base, the bottom of said tray and the bottom of said base defining a space therebetween upon insertion of said tray,
   (d) a removable grill adapted to be stored within the space defined between the bottom of said tray and the bottom of said base and upon removal from said space to be supported by said base above said tray; and
   (e) a storage chest adapted to be received within the cavity defined by the base and lid of said cabinet when said grill has been removed from the top of said base and stored within the space defined between the bottom of said tray and the bottom of said base.

2. The apparatus of claim 1 including means for securing said lid and said base in a closed position to facilitate retention of said chest within said cavity during transportation of said cabinet.

3. A compact, transportable cooking and storage apparatus, comprising, in combination:
   (a) a cavity-defining cabinet including a base and a lid pivotally mounted thereon, said base having an opening provided in the periphery thereof;
   (b) rail means carried by said base proximate the side of the base and intermediate the top and bottom thereof;
   (c) a briquette tray adapted to be inserted into and removed from said base through the opening provided in the periphery thereof and slidably carried and supported by said rail means, the bottom of said tray and the bottom of said base defining a space therebetween;
   (d) a removable grill adapted to be stored within the space defined between the bottom of said tray and said base;
   (e) support means carried by said base proximate the sides thereof and above the top of said briquette tray for supporting said grill above said briquette tray upon removal of the grill from said space; and
   (f) a storage chest adapted to be received within the cavity defined by said cabinet lid and said base when said grill is stored within said space.

4. The apparatus of claim 3 wherein the bottom of said tray is foraminous, said tray and said cabinet are provided with ventilation apertures, and the apparatus additionally includes:
   (a) means for securing said lid and said base in a closed position to facilitate retention of said chest within said cavity during transportation of said cabinet;
   (b) a removable heat deflecting plate adapted to be disposed between the said tray and said grill in an operating position and stored in said tray during transportation of said cabinet; and
   (c) means carried by and proximate the sides of said base for supporting said plate in the operating position.

References Cited

UNITED STATES PATENTS

| | | | |
|---|---|---|---|
| 1,524,961 | 2/1925 | Asche | 126—37 |
| 1,545,584 | 7/1925 | Devereaux | 126—26 |
| 2,009,189 | 7/1935 | Ash | 126—25 |
| 2,334,847 | 11/1943 | Spiers | 126—25 |
| 2,659,360 | 11/1953 | Bitney | 126—25 |
| 3,151,609 | 10/1964 | Hastings | 126—25 |

FREDERICK KETTERER, *Primary Examiner.*